United States Patent [19]

Franchuk

[11] Patent Number: 4,817,845
[45] Date of Patent: Apr. 4, 1989

[54] APPARATUS FOR PULLING SMALL-DIAMETER FRAGILE CABLE

[75] Inventor: John M. Franchuk, Lynnwood, Wash.

[73] Assignee: WesTech Gear Corporation, Lynwood, Calif.

[21] Appl. No.: 161,208

[22] Filed: Feb. 16, 1988

Related U.S. Application Data

[63] Continuation of Ser. No. 838,653, Mar. 11, 1986, abandoned.

[51] Int. Cl.⁴ .............................................. B65H 51/14
[52] U.S. Cl. ...................................... 226/172; 226/176
[58] Field of Search .............................. 226/170–174, 226/176

[56] References Cited

U.S. PATENT DOCUMENTS

| 1,568,594 | 1/1926 | Flint . | |
|---|---|---|---|
| 2,484,810 | 10/1949 | Bacon et al. . | |
| 2,679,924 | 6/1954 | Powell | 226/172 |
| 2,696,907 | 12/1954 | Fisk . | |
| 3,010,631 | 11/1961 | Gretter | 226/172 |
| 3,240,413 | 3/1966 | Young et al. . | |
| 3,372,849 | 3/1968 | Hall et al. . | |
| 3,583,620 | 6/1971 | Postins . | |
| 3,620,432 | 11/1971 | Emery | 226/172 |
| 3,752,925 | 8/1973 | Smaler . | |
| 4,039,109 | 8/1977 | Rhodes . | |

FOREIGN PATENT DOCUMENTS

| 145773 | 8/1982 | Japan . |
|---|---|---|
| 429584 | 7/1967 | Switzerland . |

Primary Examiner—John Petrakes
Attorney, Agent, or Firm—Seed and Berry

[57] ABSTRACT

An apparatus for pulling small-diameter fragile cable without damaging or deforming the cable. The apparatus includes resilient wheels and at least two flexible bar assemblies. The bar assemblies are entrained around the wheels and include a plurality of bars, each having a flat surface. The bars transfer the resilient pressure of the wheels to the cable and distribute normal tension forces over the area defined by the surface of each bar, thus eliminating point-loading.

16 Claims, 1 Drawing Sheet

APPARATUS FOR PULLING SMALL-DIAMETER FRAGILE CABLE

This application is a continuation of U.S. patent application Ser. No. 838,653, filed Mar. 11, 1986, now abandoned.

DESCRIPTION

1. Technical Field

The present invention relates to a cable tension apparatus for pulling fragile, small-diameter cable. The apparatus is particularly useful for pulling electric cable, fiberoptics cable, and the like without deforming or damaging the fragile housing of the cable.

2. Background Art

Certain fragile cables, such as electric cable, fiberoptics cable, and the like, are playing an increasingly important role in modern communication systems, extending over thousands of miles, often in submarine environments. Accordingly, there is a demand for machines and devices which aid in the hauling and laying of such cables. Particularly, there is a need for a machine which can haul and lay fragile, small-diameter cable quickly and economically.

Prior art machines for hauling cable, such as that described in my earlier U.S. Pat. No. 4,469,267, rely on resilient track belts which squeeze or grip the cable. In such a system, the high-tension portion of the track belt provides the normal force required to transport the cable and the resilient nature of the belt helps to deliver a uniform pressure over the surface area of the cable. A certain portion of the normal force is lost by deformation of the belt due to the resiliency of the belt material. This loss due to resiliency occurs at a tolerable level when large-diameter cable is being hauled; however, when the cable has a relatively small diameter, as does electric cable, the loss due to deformation is large when compared with the resultant normal force applied to the cable.

This problem may be overcome by modifying the belt such that a rigid member is coupled with the resilient belt to deliver normal force to the cable with negligible losses due to deformation of the resilient belt. However, such a system is not without its attendant problems. The rigid member must deliver a uniform pressure over an area of cable rather than merely providing point loading. The normal force must be distributed to prevent piercing of the fragile cable housing. Furthermore, the rigid member must not destroy or disrupt he desired flexibility of the belt member.

Accordingly, it is an object of the present invention to deliver a normal force to small-diameter cable to allow pulling and hauling of same with negligible losses due to deformation of the belt material.

It is a further object to distribute the normal force over an area of the cable to avoid point loading and the likelihood of piercing or deforming fragile cable housing.

DISCLOSURE OF THE INVENTION

The present invention discloses an apparatus for pulling small-diameter, fragile cable, such as fiberoptics or electric cables, and the like. In the first preferred embodiment, the invention includes at least two resilient wheels having their axes of rotation parallel to each other and having their tread surfaces opposed to one another. The spacing between the axes of rotation of the wheels should be less than the sum of the radii of the wheels.

In the second preferred embodiment, the invention includes at least four resilient wheels having their axes of rotation parallel to each other and having their tread surfaces opposed to one another. The spacing between the axes of rotation of the first and third wheels should be less than the sum of the radii of the first and third wheels so that the tread surfaces of the first and third wheels press toward each other. Similarly, the spacing between the axes of rotation of the second and fourth wheels should be less than the sum of the radii of the second and fourth wheels so that the tread surfaces of the second and fourth wheels press toward each other.

In both preferred embodiments, the invention also includes at least two independent, endless, flexible bar assemblies. In the first preferred embodiment, one such bar assembly is entrained around the first wheel and the other bar assembly is entrained around the second wheel. In the second preferred embodiment, the first bar assembly is entrained around the tread surfaces of the first and second wheels, and the second bar assembly is entrained around the tread surfaces of the third and fourth wheels.

In either preferred embodiment, each bar assembly is comprised of a plurality of bars and a means for flexibly coupling the bars together. Each bar is defined by top and bottom surfaces which are substantially parallel to each other, said top surface being situated to face toward the tread surface of the wheel. The bars are rigid in their length, width and depth dimensions, which are defined as follows. The width dimension of a bar is defined as the dimension parallel to the transverse direction of the tread surface of a wheel and is approximately equal to the transverse measurement of the tread surface of the wheel. The length dimension of a bar is defined as the dimension parallel to the longitudinal direction of the tread surface of the wheel. The gap between successive bars is less than the length of each bar. Each bar is further defined by a leading edge which extends along the width direction of the bottom surface of the bar.

Each flexible bar assembly is frictionally engaged with the tread surfaces of each respective wheel. The rigidity of the bars is sufficient to transmit the resilient pressure of the wheel without bending the bar. The bar assemblies and wheels are adapted to engage and apply a frictional pulling force on opposite sides of a cable to transport the cable along a path of movement of the bars. The flexible means coupling bars together allows each bar to pivot about its leading edge to allow the bottom surface of the bar to press flat against the cable when the leading edge is pressed against the cable. Said flexible means may comprise an elastomeric belt and a means for fastening the bars to the belt, with the elastomeric belt in the gap between the bars providing the compliance to allow a leading edge of a bar to pivot and cause the entire bottom surface of the bar to press flat along the cable.

BEST MODE FOR CARRYING OUT THE INVENTION

The present invention discloses an apparatus for applying tension to a small-diameter linear member, such as cable. More specifically, the invention is the means by which the tension forces are applied to the cable by the coaction of resilient wheels and rigid bars entrained around the wheels.

The invention may be practiced in at least two preferred embodiments. The first preferred embodiment is a single-wheel arrangement illustrated in FIG. 1. The second preferred embodiment is a dual-wheel arrangement shown in FIG. 3. FIG. 2 illustrates the relative position of bars, including the top and bottom surfaces of said bars, during operation of either preferred embodiment of the invention.

Figure 1:
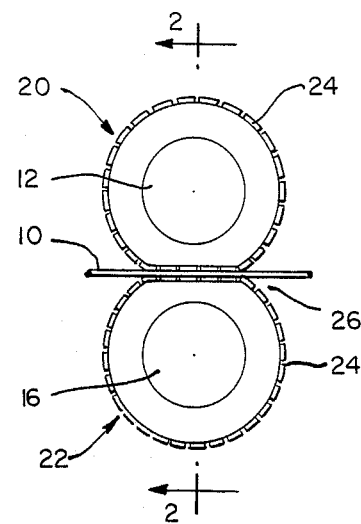
FIG. 1 is a side view of a single-wheel embodiment of the present invention.
Figure 2:
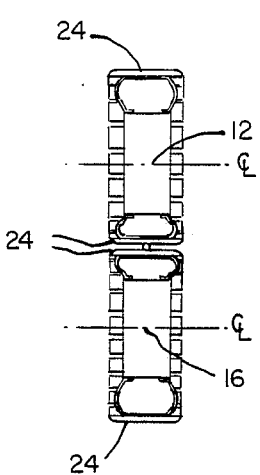
FIG. 2 is a sectional view of the relative positions of the bars in the flexible bar assembly.

Referring to FIG. 1, the first preferred embodiment, or single-wheel arrangement, comprises a first wheel 12 and a second wheel 16. Each wheel has a resilient tread surface which may be manufactured, for example, from synthetic rubber or other such compliant materials.

The first and second wheels are aligned with each other so that their respective axes of rotation are parallel, and their tread surfaces oppose one another. The spacing between said axes of rotation may be adjusted to accommodate varying sizes of cable and should be adjusted so that it is less than the sum of the radii of the two wheels such that the respective tread surfaces of the wheels press toward each other and compress one another. The wheels operate in tandem to impart a squeeze force on a cable 10.

The single-wheel arrangement also comprises at least two flexible bar assemblies. The first bar assembly 20 is entrained around the first wheel 12, and the second bar assembly 22 is entrained around the second wheel 16.

Figure 3:
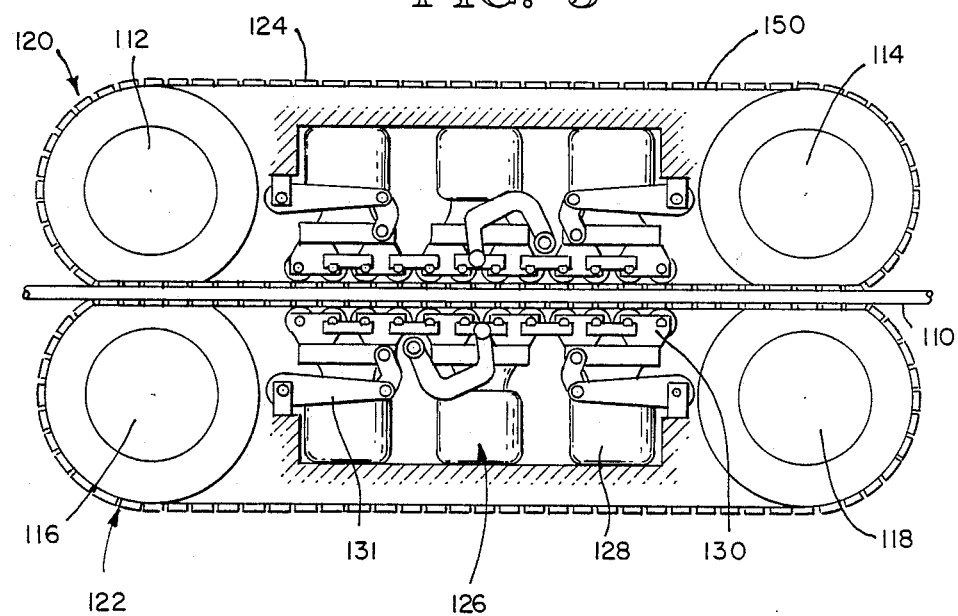
FIG. 3 is a side view of a dual-wheel embodiment of the present invention.

As shown schematically in FIG. 3, each bar assembly comprises a plurality of rigid bars and an elastomeric belt to which the bars are attached by rivets 150 or otherwise fixed to produce an independent, endless flexible assembly. The bars may also be coupled through use of a flexible link chain arrangement.

Referring to FIG. 2, each bar 24 is defined by a top surface 27 and a bottom surface 28 which are substantially parallel to each other, where the top surface is situated to face toward the tread surfaces of the respective wheel and the bottom surface is situated to face away from the tread surface of the respective wheel. Each bar is sufficiently rigid in its three dimensions—length, width and depth—to transmit the resilient pressure of the respective wheel to the cable without bending or otherwise deforming the bar. Each bar may be rectangular in cross section, as shown schematically in FIG. 1.

The dimensions of each bar are defined as follows. The width dimension of a bar is defined as the dimension parallel to the transverse direction of the tread surface of the respective wheel. The width of the bar is approximately equal to the transverse measurement, or width, of the tread surface of the respective wheel. This ensures uniform pressure being applied across the entire width of the tread surface. The length dimension of a bar is defined as the dimension parallel to the longitudinal direction of the tread surface of the wheel at that portion of the tread surface to which the bar is frictionally engaged. The length of each bar is greater than the gap between successive bars. Such an arrangement assures a substantially continuous flat surface engagement on both sides of the cable. This is important because surface engagement which is substantially non-continuous, or intermittent, could result in a bar on one assembly squeezing the cable into a gap in the opposing assembly to produce buckling or pinching of the cable and possible damage to or deformation of the cable.

Each bar is further defined by a leading edge 26 which extends along the width direction of the bottom surface of the bar. Each bar is secured to the elastomeric belt or link chain by bonding or by mechanical fasteners, such as rivets 150, shown schematically in FIG. 3.

In operation, the first and second wheels rotate in opposing directions. The bar assemblies, being frictionally engaged with the wheels, approach each other from opposing directions. As the leading edge 26 of a bar comes into contact with the surface of the cable, the flexibility of the elastomeric belt or link chain arrangements allows the bar to pivot along its leading edge so that its entire bottom surface 28 comes into contact with the cable. As shown in FIG. 2, the bars contacting the cable do so along the entire bottom surface area of the bar rather than along a line or at a point. Accordingly, the invention allows efficient transport of a cable without the danger of puncture or deformation of the cable due to point-loading. The bars thus deliver a uniform normal force to the cable by transferring the resilient force from the wheels to the cable without substantial loss of force due to resiliency of the wheels. The bars also ensure the application of a uniform normal force distributed over an entire surface to prevent problems of deformation.

The second preferred embodiment, or dual-wheel arrangement, is shown in FIG. 3. This embodiment is constructed similarly to the single-wheel arrangement and includes at least two independent, endless, flexible bar assemblies. These two bar assemblies comply with the same specifications described in the discussion of the first preferred embodiment. The dual-wheel arrangement is different, however, in that it has at least four resilient wheels and the first bar assembly 120 is entrained around the first wheel 112 and the third wheel 114, while the second bar assembly 122 is entrained around the second wheel 116 and the fourth wheel 118. The first and third wheels are thus coupled by the first bar assembly, and the second and fourth wheels are coupled by the second bar assembly.

In operation, as in the first preferred embodiment, the rotating wheels drive the bar assemblies so that the bars on the respective assemblies approach the cable 110 from opposite directions. The flexibility of the bar assembly allows each bar to pivot about its leading edges as it comes in contact with the cable. The entire bottom surface of the bar then comes into contact with the cable and transfers the resilient pressure from the wheel to the cable. As FIG. 2 demonstrates, the bars are parallel to each other as they apply pressure to opposite sides of the cable.

Referring again to FIG. 3, the second preferred embodiment may include a tensioner arrangement 126 with a squeeze force system, such as a fluid film (pneumatic or hydraulic) slide or roller bearing. In the embodiment shown, a suitable squeeze force system includes conventional air bags or springs 128 coupled to rollers 130 by pivotal arms 131. Other squeeze force systems may be of the form shown in U.S. Pat. No. 4,469,267. The advantages of such a squeeze force system are low frictional drag and quiet operations. By using a low friction squeeze force system as shown, the frictional pull force on the cable is spread over all bars in contact with the cable, thus allowing greater pulling force to be applied without damaging the cable. Such advantages enhance this invention's dynamic response and overall system efficiency.

I claim:

1. Apparatus for pulling small-diameter fragile cable, such as a fiberoptics or electric cable or the like, comprising:

at least two resilient wheels having tread surfaces and having their axes of rotation parallel to each other and having their tread surfaces opposed to one another; and at least two independent, endless, flexible bar assemblies, wherein the first bar assembly is entrained around the tread surface of the first wheel and the second bar assembly is entrained around the tread surface of the second wheel, and wherein each bar assembly further comprises:

a plurality of bars, wherein each bar is defined by a top and bottom surface with the bottom surface being substantially flat, said top surface being situated to face toward the tread surface of the wheel, said bars being sufficiently rigid in their length, width and depth dimensions to transmit the resilient pressure of the wheel without bending the bar, said width dimension of the bar being defined as the dimension parallel to the transverse direction of the tread surface of the wheel and being approximately equal to the transverse measurement of the tread surface of the wheel, said length direction of the bar being defined as the dimension parallel to the longitudinal direction of the tread surface of the wheel, wherein the gap between successive bars is less than the length of each bar, each said bar being defined by a leading edge, extending along the width of the bottom surface of the bar, and flexible coupling means entrained around the tread surface of each wheel, means for attaching each bar to the flexible coupling means whereby the flexibility of the flexible coupling means allows the bar to pivot about its leading edge to allow the bottom surface of the bar to press flat against the cable when the leading edge is pressed against the cable by the wheel; and wherein each bar assembly is frictionally engaged with the tread surface of each respective wheel and whereby the wheels and bar assemblies are adapted to engage and apply a frictional pulling force on the opposite side of a cable to transport the cable along a path of movement of the bars.

2. The apparatus of claim 1 wherein said flexible coupling means is an elastomeric belt and includes a means for fastening the bars to the belt, with the elastomeric belt in the gap between the bars providing the compliance to allow a leading edge of a bar to pivot and cause the entire length of a bar to press flat along the movement of the bars.

3. The apparatus of claim 1 wherein the spacing between the axes of rotation of the wheels is less than the sum of the radii of the two wheels so that the tread surfaces of the wheels press toward and compress each other.

4. Apparatus for pulling small-diameter fragile cable, such as fiberoptics or electric cable or the like, comprising:

at least four resilient wheels having tread surfaces and having their axes of rotation parallel to each other and having their tread surfaces opposed to one another; and at least two independent, endless, flexible bar assemblies wherein the first bar assembly is entrained around the tread surfaces of the first and third wheels, and the second bar assembly is entrained around the tread surfaces of the second and fourth wheels, and wherein each bar assembly further comprises:

a plurality of bars, wherein each bar is defined by a top and bottom surface which are substantially parallel to each other, said top surface situated to face toward the tread surface of the wheel, said bars being sufficiently rigid in their length, width and depth dimensions to transmit normal and tangential tension forces to the cable without bending the bar, said width dimension of the bar being defined as the dimension parallel to the transverse direction of the tread surface of the wheel and being approximately equal to the transverse measurement of the tread surface of the wheel, said length direction of the bar being defined as the dimension parallel to the longitudinal direction of the tread surface of the wheel, wherein the gap between successive bars is less than the length of each bar, each said bar being defined by a leading edge extending along the width of the bottom surface of the bar, and flexible coupling means entrained around the tread surface of each wheel, means for attaching each bar to the flexible coupling means whereby the flexibility of the flexible coupling means allows the bar to pivot about its leading edge to allow the bottom surface of the bar to press flat against the cable when the leading edge is pressed against the cable by the wheel, and whereby each bar assembly is frictionally engaged with each respective pair of wheels and whereby the wheels and bar assemblies are adapted to engage and apply a frictional pulling force on opposite sides of a cable to transport the cable along a path of movement of the bars.

5. The apparatus of claim 4, further comprising a squeeze force means on opposite sides of the path of movement of the bars and between the first and third wheels and between the second and fourth wheels for applying a low friction pressure force on the flexible bar assemblies toward one another.

6. The apparatus of claim 4 wherein said flexible coupling means is an elastomeric belt and a means for fastening the bars to the belt with the elastomeric belt in the gap between the bars providing the compliance to allow a leading edge of a bar to pivot and cause the entire length of a bar to press flat along the path of movement of the bars.

7. The apparatus of claim 4 wherein the spacing between the axes of rotation of the first and second wheels is less than the sum of the radii of the first and second wheels so that the tread surfaces of the first and second wheels press toward each other; and wherein the spacing between the axes of rotation of the third and fourth wheels is less than the sum of the radii of the third and fourth wheels so that the tread surfaces of the third and fourth wheels press toward each other.

8. The apparatus of claim 4 wherein the wheels press toward each other and compress one another.

9. Apparatus for pulling small-diameter cable, such as fiberoptics or electric cable or the like, comprising:

at least two resilient wheels having their axes or rotation parallel to each other and having their tread surfaces opposed to one another; and at least two independent, endless, flexible bar assemblies, wherein the first bar assembly is entrained around the tread surface of the first wheel and the second bar assembly is entrained around the tread surface of the second wheel, and wherein said bar assembly further comprises:

a plurality of bars, wherein each bar is defined by a top and bottom surface with the bottom surface being substantially flat, said top surface being situated to face toward the tread surface of the wheel, said bars being sufficiently rigid in their length, width and depth dimensions to transmit the resilient pressure of the wheel without bending the bar, said width dimension of the bar being defined as the dimension parallel to the transverse direction of the tread surface of the wheel and being approximately equal to the transverse measurement of the tread surface of the wheel, said length direction of the bar being defined as the dimension parallel to the longitudinal direction of the tread surface of the wheel, wherein the gap between successive bars is less than the length of each bar, each said bar being defined by a leading edge, extending along the width of the bottom surface of the bar; and flexible coupling means entrained around the tread surface of each wheel, means for attaching each bar to the flexible coupling means whereby the flexibility of the flexible coupling means allows the bar to pivot about its leading edge to allow the bottom surface of the bar to press flat against the cable when the leading edge is pressed against the cable by the wheel; and wherein each bar assembly is frictionally engaged with the tread surface of each respective wheel and whereby the wheels and bar assemblies are adapted to engage and apply a frictional pulling force on the opposite side of a cable to transport the cable along a path of movement of the bars.

10. The apparatus of claim 9 wherein said flexible coupling means is an elastomeric belt and includes a means for fastening the bars to the belt, with the elastomeric belt in the gap between the bars providing the compliance to allow a leading edge of a bar to pivot and cause the entire length of a bar to press flat along the movement of the bars.

11. The apparatus of claim 9 wherein the spacing between the axes of rotation of the wheels is less than the sum of the radii of the two wheels so that the tread surfaces of the wheels press toward and compress each other.

12. Apparatus for pulling small-diameter cable, such as fiberoptics or electric cable or the like, comprising:

at least four resilient wheels having their axes of rotation parallel to each other and having their tread surfaces opposed to one another; and at least two independent, endless, flexible bar assemblies wherein the first bar assembly is entrained around the tread surfaces of the first and third wheels, and the second bar assembly is entrained around the tread surfaces of the second and fourth wheels, and wherein each bar assembly further comprises:

a plurality of bars, wherein each bar is defined by a top and bottom surface which are substantially parallel to each other, said top surface situated to face toward the tread surface of the wheel, said bars being sufficiently rigid in their length, width and depth dimensions to transmit normal and tangential tension forces to the cable without bending the bar, said width dimension of the bar being defined as the dimension parallel to the transverse direction of the tread surface of the wheel and being approximately equal to the transverse measurement of the tread surface of the wheel, said length direction of the bar being defined as the dimension parallel to the longitudinal direction of the tread surface of the wheel, wherein the gap between successive bars is less than the length of each bar, each said bar being defined by a leading edge extending along the width of the bottom surface of the bar; and flexible coupling means entrained around the tread surface of each wheel, means for attaching each bar to the flexible coupling means whereby the flexibility of the flexible coupling means allows the bar to pivot about its leading edge to allow the bottom surface of the bar to press flat against the cable when the leading edge is pressed against the cable by the wheel, whereby each bar assembly is frictionally engaged with each respective pair of wheels and whereby the wheels and bar assemblies are adapted to engage and apply a frictional pulling force on opposite sides of a cable to transport the cable along a path of movement of the bars.

13. The apparatus of claim 12, further comprising a squeeze force means on opposite sides of the path of movement of the bars and between the first and third wheels and between the second and fourth wheels for applying a low friction pressure force on the flexible bar assemblies toward one another.

14. The apparatus of claim 12, wherein said flexible coupling means is an elastomeric belt and a means for fastening the bars to the belt with the elastomeric belt in the gap between the bars providing the compliance to allow a leading edge of a bar to pivot and cause the entire length of a bar to press flat along the path of movement of the bars.

15. The apparatus of claim 12 wherein the spacing between the axes of rotation of the first and second wheels is less than the sum of the radii of the first and second wheels so that the tread surfaces of the first and second wheels press toward each other; and wherein the spacing between the axes of rotation of the third and fourth wheels is less than the sum of the radii of the third and fourth wheels so that the tread surfaces of the third and fourth wheels press toward each other.

16. The apparatus of claim 12 wherein the wheels press toward each other and compress one another.

* * * * *

UNITED STATES PATENT AND TRADEMARK OFFICE
CERTIFICATE OF CORRECTION

PATENT NO. : 4,817,845

DATED : April 4, 1989

INVENTOR(S) : John M. Franchuk

It is certified that error appears in the above-identified patent and that said Letters Patent is hereby corrected as shown below:

In Claim 9, column 7, line 5, delete "or" and substitute therefor --of--.

In Claim 12, column 8, line 12, delete "dending" and substitute therefor --bending--.

Signed and Sealed this

Second Day of January, 1990

Attest:

JEFFREY M. SAMUELS

Attesting Officer

Acting Commissioner of Patents and Trademarks